US011062893B2

(12) United States Patent
Saetveit et al.

(10) Patent No.: US 11,062,893 B2
(45) Date of Patent: Jul. 13, 2021

(54) SYSTEM FOR AUTOMATIC SAMPLING, SAMPLE DIGESTION, AND JOINING A PLURALITY OF SAMPLE INTRODUCTION SYSTEMS

(71) Applicant: Elemental Scientific, Inc., Omaha, NE (US)

(72) Inventors: Nathan Saetveit, Omaha, NE (US); Michael P. Field, Papillion, NE (US); Daniel R. Wiederin, Omaha, NE (US); Tyler Yost, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 263 days.

(21) Appl. No.: 16/240,766

(22) Filed: Jan. 6, 2019

(65) Prior Publication Data

US 2019/0214242 A1 Jul. 11, 2019

Related U.S. Application Data

(60) Provisional application No. 62/614,744, filed on Jan. 8, 2018, provisional application No. 62/614,761, filed on Jan. 8, 2018.

(51) Int. Cl.
*H01J 49/04* (2006.01)
*G01N 35/10* (2006.01)
*G01N 1/40* (2006.01)
*G01N 1/38* (2006.01)
*B01F 15/00* (2006.01)
*B01F 15/04* (2006.01)
(Continued)

(52) U.S. Cl.
CPC .... *H01J 49/0486* (2013.01); *B01F 15/00155* (2013.01); *B01F 15/00396* (2013.01);
(Continued)

(58) Field of Classification Search
CPC .... H01J 49/105; H01J 49/045; G01N 21/714; G01N 1/2258; G01N 1/22; G01N 1/24;
(Continued)

(56) References Cited

U.S. PATENT DOCUMENTS 5,353,722 A * 10/1994 Vassiliou ............... F23G 5/085
110/185
5,597,595 A * 1/1997 DeWille ................. A23L 2/00
426/590
(Continued)

OTHER PUBLICATIONS

Harrington, Analysis of Human Serum and Whole Blood for Mineral Content by ICP-MS and ICP-OES: Development of a Mineralomics Method, Jul. 2014, NIH Public Access, pp. 1-24 (Year: 2014).*

*Primary Examiner* — John Fitzgerald
*Assistant Examiner* — Truong D Phan
(74) *Attorney, Agent, or Firm* — Kevin E. West; Advent, LLP

(57) ABSTRACT

Systems and methods for automatic sampling, digestion, and joining a plurality of sample introduction systems of a sample for subsequent analysis by ICP-MS are described. A system embodiment may include: a digestion vessel configured to receive a sample from a pressurized sample source; a shutoff valve configured to control a flow of the sample to the digestion vessel; a first syringe pump configured to introduce a reagent to the sample in the digestion vessel; a thermally-controlled block surrounding the digestion vessel and configured to control the temperature of the digestion vessel, wherein the thermally-controlled block increases the temperature of the digestion vessel to a first set temperature before digestion and wherein the thermally-controlled block decreases the temperature of the digestion vessel to a second set temperature after digestion; a level sensor configured to measure a level of the sample within the digestion vessel; a second syringe pump configured to introduce deionized water to the digestion vessel after digestion, based at least in part on the level measured by the level sensor; and a
(Continued)

connector valve configured to receive digested sample from the digestion vessel and transfer the digested sample to an analysis system.

20 Claims, 6 Drawing Sheets

(51) Int. Cl.
B01F 15/06 (2006.01)
B01F 15/02 (2006.01)

(52) U.S. Cl.
CPC ...... *B01F 15/0227* (2013.01); *B01F 15/0243* (2013.01); *B01F 15/0454* (2013.01); *B01F 15/065* (2013.01); *G01N 1/4044* (2013.01); *G01N 35/1016* (2013.01); *G01N 35/1095* (2013.01); *G01N 35/1097* (2013.01); *B01F 2215/0037* (2013.01); *G01N 2001/386* (2013.01)

(58) Field of Classification Search
CPC .............. G01N 30/24; G01N 35/1079; G01N 35/1095; H05H 1/26; H05H 2001/4652
See application file for complete search history.

(56) References Cited

U.S. PATENT DOCUMENTS

| | | | | |
|---|---|---|---|---|
| 5,609,897 | A * | 3/1997 | Chandler | A61K 33/06 426/548 |
| 5,698,222 | A * | 12/1997 | Mazer | A61K 33/06 424/439 |
| 5,969,352 | A * | 10/1999 | French | H01J 49/105 250/288 |
| 6,002,129 | A * | 12/1999 | Ito | H01J 49/105 250/281 |
| 9,177,772 | B1 * | 11/2015 | Wiederin | H01J 49/045 |
| 9,406,490 | B1 * | 8/2016 | Saetveit | H01J 49/0031 |
| 10,379,132 | B1 * | 8/2019 | Wiederin | G01N 35/1097 |
| 10,741,374 | B1 * | 8/2020 | Wiederin | G01N 21/714 |
| 10,834,807 | B1 * | 11/2020 | Wiederin | H05H 1/26 |
| 2010/0322822 | A1 * | 12/2010 | Fritchie | G01N 35/1065 422/63 |
| 2014/0283628 | A1 * | 9/2014 | Hattingh | H01J 49/0454 73/864.81 |
| 2015/0247840 | A1 * | 9/2015 | Miller | G01N 1/38 435/7.1 |
| 2019/0070601 | A1 * | 3/2019 | Wiederin | G01N 1/38 |

* cited by examiner

SYSTEM FOR AUTOMATIC SAMPLING, SAMPLE DIGESTION, AND JOINING A PLURALITY OF SAMPLE INTRODUCTION SYSTEMS

CROSS-REFERENCE TO RELATED APPLICATIONS

The present application claims the benefit of 35 U.S.C. § 119(e) of U.S. Provisional Application Ser. No. 62/614,744 filed Jan. 8, 2018 and titled "SYSTEM FOR JOINING A PLURALITY SAMPLE INTRODUCTION SYSTEMS," and U.S.

Provisional Application Ser. No. 62/614,761 filed Jan. 8, 2018 and titled "SYSTEM FOR AUTOMATIC SAMPLING AND SAMPLE DIGESTION." U.S. Provisional Application Ser. No. 62/614,744 and U.S. Provisional Application Ser. No. 62/614,761 are herein incorporated by reference in their entireties.

BACKGROUND

Spectrometry refers to the measurement of radiation intensity as a function of wavelength to identify component parts of materials. Inductively Coupled Plasma (ICP) spectrometry is an analysis technique commonly used for the determination of trace element concentrations and isotope ratios in liquid samples. For example, in the semiconductor industry, ICP spectrometry can be used to determine metal concentrations in samples. ICP spectrometry employs electromagnetically generated partially ionized argon plasma that reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample. The sample to be analyzed is often provided in a sample mixture.

Sample introduction systems may be employed to introduce liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

DRAWINGS

The detailed description is described with reference to the accompanying figures. In the figures, the use of the same reference numbers in different instances in the description and the figures may indicate similar or identical items.

DETAILED DESCRIPTION

Overview

Figure 1A:
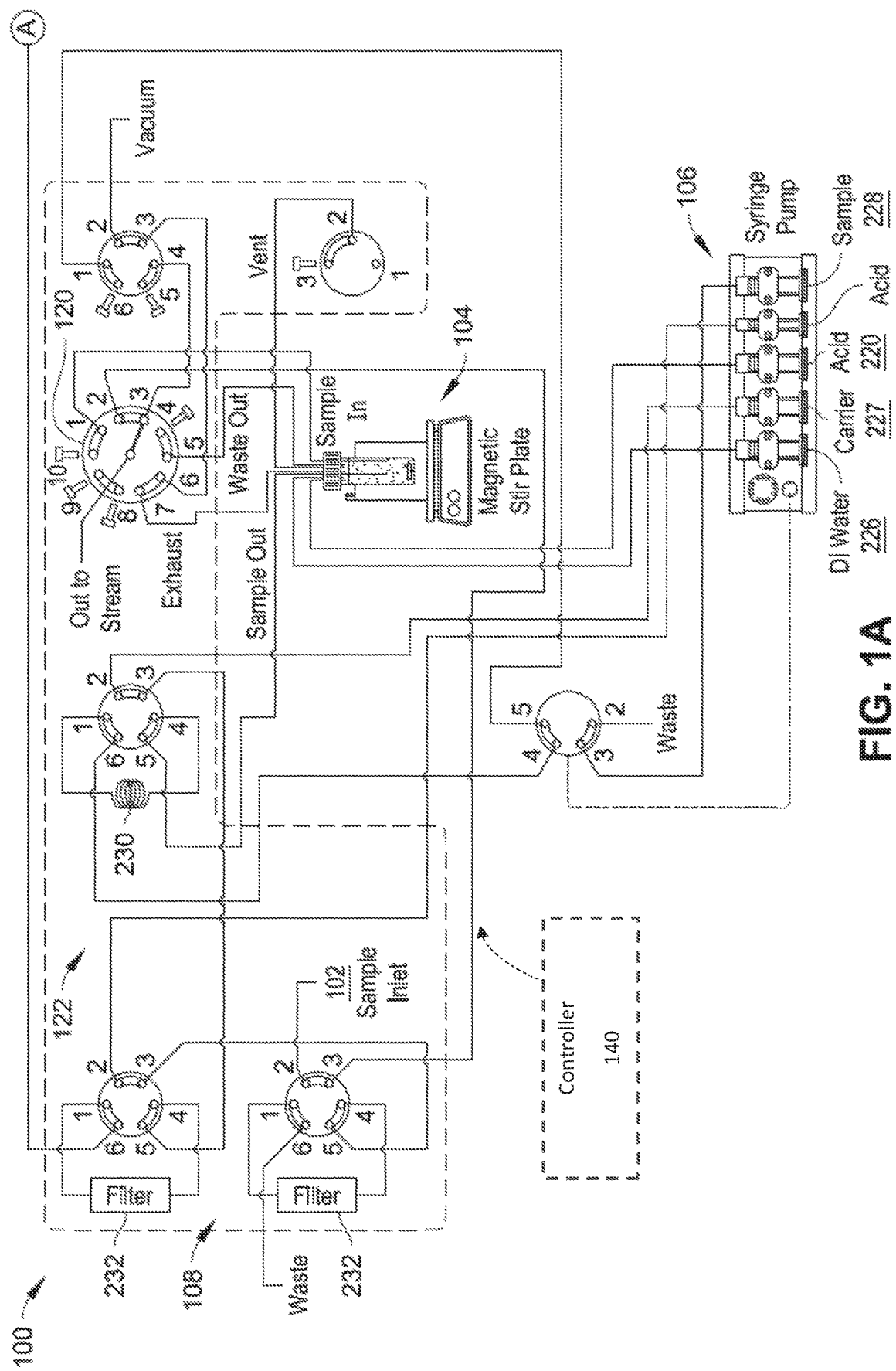
FIG. 1A is a partial schematic illustration of a system for automatic sampling, digestion, and joining a plurality of sample introduction systems of a sample and for transport and preparation of the digested sample for analysis in accordance with example implementations of the present disclosure.

Systems and methods for automatic sampling, digestion, and joining a plurality of sample introduction systems of a sample for subsequent analysis by ICP-MS are described. A system embodiment for a sample introduction system includes, but is not limited to, a digestion vessel configured to receive a sample from a pressurized sample source; a shutoff valve configured to control a flow of the sample to the digestion vessel; a first syringe pump configured to introduce a reagent to the sample in the digestion vessel; a thermally-controlled block surrounding the digestion vessel and configured to control the temperature of the digestion vessel, wherein the thermally-controlled block increases the temperature of the digestion vessel to a first set temperature before digestion and wherein the thermally-controlled block decreases the temperature of the digestion vessel to a second set temperature after digestion; a level sensor configured to measure a level of the sample within the digestion vessel; a second syringe pump configured to introduce deionized water to the digestion vessel after digestion, based at least in part on the level measured by the level sensor; and a connector valve configured to receive digested sample from the digestion vessel and transfer the digested sample to an analysis system.

A method embodiment for automatic sampling and digestion includes, but is not limited to, controlling a flow of a sample from a pressurized sample source to a digestion vessel via a shutoff valve; capturing a specific volume of the sample in the digestion vessel; adding a reagent to the sample in the digestion vessel via a first syringe pump; increasing a temperature of the digestion vessel to a first set temperature for a set time using a thermally-controlled block; digesting the sample in the digestion vessel; measuring a level of the sample inside the digestion vessel via a level sensor; based at least in part on the measured level of the sample inside the digestion vessel, introducing deionized water, via a second syringe pump, to the digestion vessel to return the sample to the specific volume; actively decreasing the temperature of the digestion vessel to room temperature using the thermally-controlled block; and transferring the sample from the digestion vessel to an analysis system.

Another system embodiment for automatic sampling, digestion and joining a plurality of sample introduction systems includes, but is not limited to, a connector valve coupled between at least two sample introduction systems, the connector valve configured to receive a first sample from a first sample introduction system and a second sample from a second sample introduction system. The first sample introduction system includes, a digestion vessel configured to receive the first sample from a pressurized sample source; a shutoff valve configured to control a flow of the first sample to the digestion vessel; a first syringe pump configured to introduce a reagent to the first sample in the digestion vessel; a thermally-controlled block surrounding the digestion vessel and configured to control the temperature of the digestion vessel, wherein the thermally-controlled block increases the temperature of the digestion vessel to a first set temperature before digestion and wherein the thermally-controlled block decreases the temperature of the digestion vessel to a second set temperature after digestion; a level sensor configured to measure a level of the first sample inside the digestion vessel; and a second syringe pump configured to introduce deionized water to the digestion vessel after digestion, based at least in part on the level of the first sample measured by the level sensor. The system further includes a sample loop in fluid communication with the connector valve, the sample loop configured to receive a first sample pushed by a first pump and configured to receive the second sample pulled by a second pump; and an analysis system configured to analyze at least one of: the first sample or the second sample.

Example Implementations

Referring to FIGS. 1A, 1B, 1C, 2, and 3, systems and methods for automatic sampling and digestion of a sample, transport and preparation of the digested sample for analysis, and joining a plurality of sample introduction systems are described. The sample digestion can involve adding acid or other reagent to a sample and heating the sample to dissolve metals or other compounds present in the sample into solution for subsequent analysis of species of interest in the digested sample.

Figure 1B:
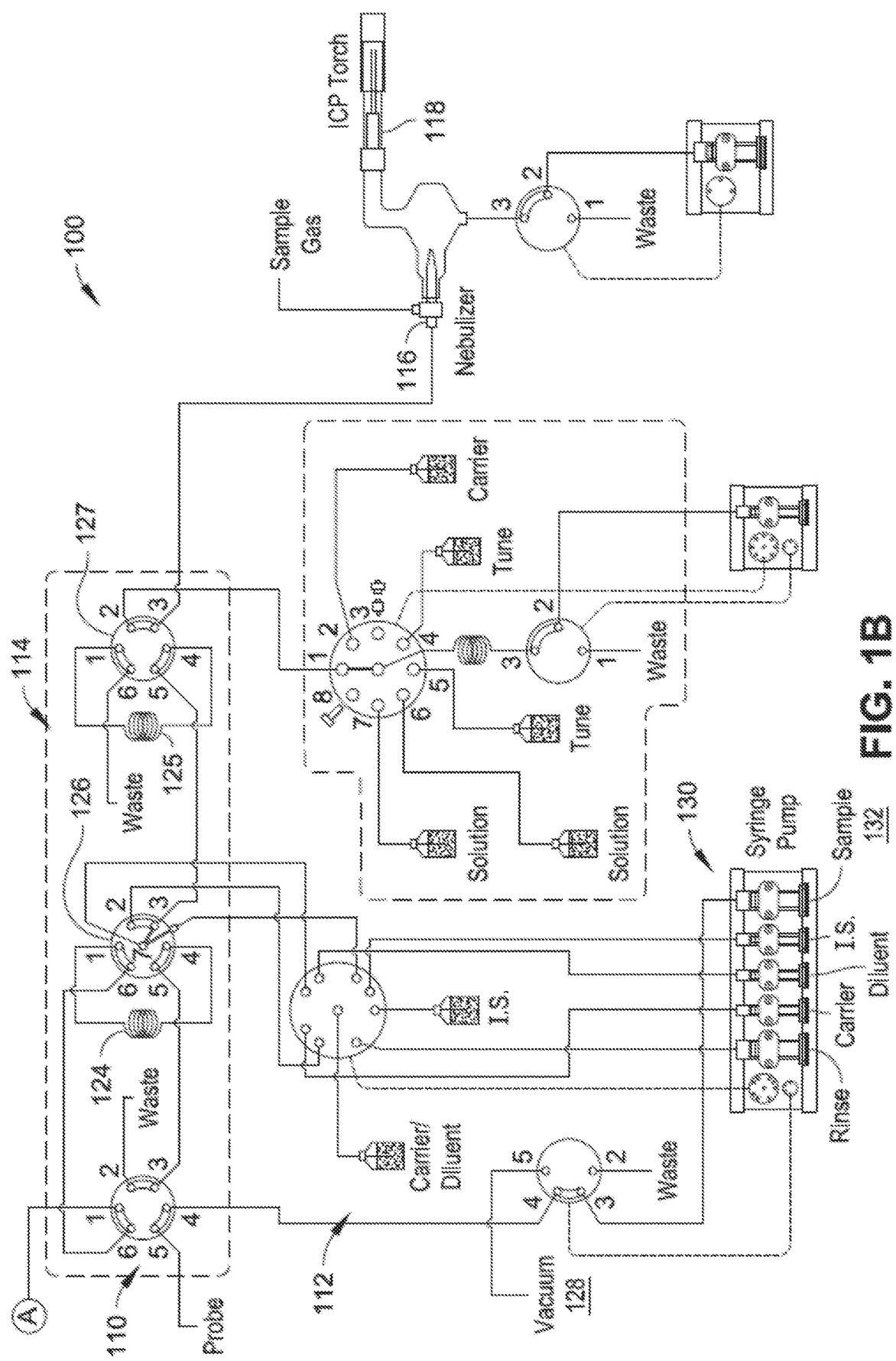
FIG. 1B is a partial schematic illustration of the system from FIG. 1A for automatic sampling, digestion, and joining a plurality of sample introduction systems of a sample and for transport and preparation of the digested sample for analysis in accordance with example implementations of the present disclosure.

FIGS. 1A and 1B illustrate a system 100 for automatic sampling and digestion of a sample, transport and preparation of the digested sample for analysis, and joining a plurality of sample introduction systems in an example implementation. As shown, the system 100 generally includes a sample input 102, a digestion system 104, a first pump system 106, a filter system 108, a connector valve 110, a secondary sample source 112, a sample introduction system 122, a second sample introduction system 114, a nebulizer 116, and a torch 118. Throughout the disclosure, the terms sample preparation system and sample introduction system may be used interchangeably. The sample input 102 can receive a sample from a pressurized sample source, such as a chemical recirculating stream or another pressurized sample source. The sample received from the sample input 102 can then be introduced to the digestion system 104 (e.g., via a cutoff valve 120). In implementations, the cutoff valve 120 controls the flow of sample to the digestion system 104, such as by switching configurations of the cutoff valve to provide differing flow paths and removing a flow path between the sample input 102 and the digestion system 104. The flow of the sample to the digestion system 104 can be stopped according to a desired time of flow, a desired volume of flow (e.g., as determined by digestion sample size, by flow rate of the sample and a given time of permitting flow between the sample input 102 and the digestion system 104, or the like), or another parameter.

Figure 2:
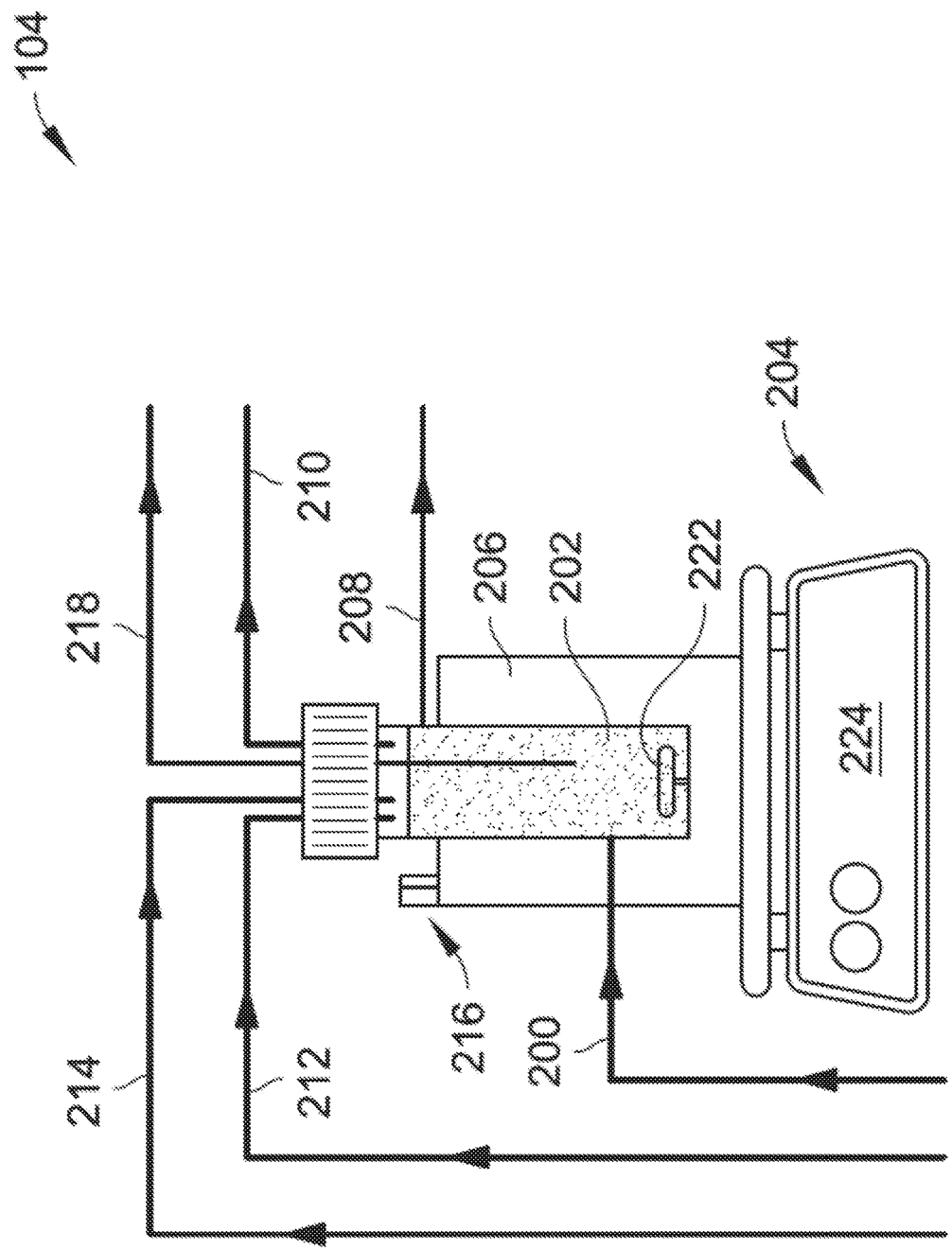
FIG. 2 is a schematic illustration of a digestion system from the system shown in FIG. 1A in accordance with example implementations of the present disclosure.

Referring to FIG. 2, the digestion system 104 is shown in an example implementation. As shown, the digestion system 104 generally includes a sample input stream 200, a digestion vessel 202, an agitation system 204, a temperature control system 206, an overflow outlet 208, a secondary overflow outlet 210, an acid input 212, a deionized water input 214, a level sensor 216, and a digested sample outlet 218. In implementations, the cutoff valve 120 controls the flow of sample from the sample input 102 to the sample input stream 200. The volume of sample introduced to the digestion system 104 can be controlled by the volume of the digestion vessel 202, where excess sample can be removed via the overflow outlet 208 and/or the secondary overflow outlet 210. In implementations, the secondary overflow outlet 210 includes a leak sensor to monitor flow of fluid through the secondary overflow outlet 210 from the digestion vessel 202. Once the desired volume of sample is positioned within the digestion vessel 202, acid or other reagent is introduced to digestion vessel via acid input 212, where the acid or other reagent can be added via a syringe pump (e.g., syringe pump 220 shown in FIG. 1A) of the first pump system 106. Following introduction of the acid or other reagent, or prior to or in combination therewith, the temperature control system 206 increases the temperature of the digestion vessel 202 to control the conditions of the combined sample and acid or other reagent, such as for digestion of metals present in the sample. In implementations, the temperature control system 206 increases the temperature of the digestion vessel to a set temperature, for a set amount of time, or combinations thereof. For example, the temperature control system 206 can include a thermally-controlled block, such as a Peltier device, to support the digestion vessel 202 and to control the temperature of the digestion vessel 202 to a first set temperature for a specific period of time. The conditions within the digestion system 104 can also be managed by the agitation system 204, where the fluid within the digestion system 104 can be agitated to facilitate the digestion process. In implementations, the agitation system 204 includes a magnetic stir bar 222 within the digestion vessel 202 and a magnetic stir plate 224 to control rotation of the magnetic stir bar 222 within the digestion vessel 202.

Following the digestion process, deionized water is added to the digestion vessel 202 via the deionized water input 214. In implementations, the deionized water is introduced to the digestion system 104 via a syringe pump, such as syringe pump 226 shown in FIG. 1A. In another example implementation, deionized water can also be introduced by other means, such as via a peristaltic pump. The deionized water is added to the digestion vessel 202 to return the sample to a specific volume following digestion. In implementations, the specific volume is achieved through control of the syringe pump 226 via output from a sensor. For instance, the digestion system 104 can include the level sensor 216 at a specific height of the digestion vessel 202 to halt operation of the syringe pump 226 upon detection by the level sensor 216 of a particular level of liquid present in the digestion vessel 202. In implementations, the level sensor 216 can include, but is not limited to, an optical sensor, a capacitive sensor, or combinations thereof. After returning the sample to the specific volume with addition of the deionized water, the temperature control system 206 actively cools the sample within the digestion vessel 202 to a second set temperature lower than the first set temperature. In an example embodiment, the second set temperature may approximately equal room temperature. The system 100 then pulls the sample from the digestion vessel 202 through the digested sample outlet 218 via a syringe pump. For example, syringe pump 228 of the first pump system 106 can draw the sample from the digestion vessel 202 and into a sample loop 230. The sample can then be pushed from the sample loop 230 (e.g., via action of the syringe pump 228) to the filter system 108, which includes one or more filters 232 to filter the sample prior to transferring the sample to a secondary system for sample analysis or for further chemical processes (e.g., additional digestion, etc.). For example, following filtration, the sample can be introduced to the connector valve 110 (shown in FIG. 1B), which can then transfer the sample to the sample preparation system 114.

Referring to FIG. 1B, the connector valve 110 joins the first sample introduction system 122 with the second sample introduction system 114 to permit a sample to be introduced to the system 100 via being pulled into a loop 124 or 125 from operation of the sample introduction system 114 or by being pushed into the loop 124 or 125 through operation of the sample introduction system 122. For instance, the sample introduction system 122 includes, but is not limited to, the digestion system 104, the first pump system 106, and the filter system 108 previously described herein. To introduce the sample from the sample introduction system 122 to the loop 124 or 125, the connector valve 110 can be in a load configuration (as shown in FIG. 1A), where the syringe 228 pushes the sample through the filter 232 and onto the connector valve 110, which is in fluid communication with a valve 126 of the second sample introduction system 114, to push the sample into the loop 124. The sample can then be prepared for analysis by an analytical device (e.g., ICPMS) following introduction to the analytical device via the nebulizer 116 and the torch 118.

The second sample introduction system 114 can introduce a secondary sample source 112 to the loop 124 by pulling one or more samples from the secondary sample source 112 through operation of a vacuum pump 128 or a pump from a second pump system 130 (e.g., syringe pump 132) when the connector valve 110 is in an inject configuration (e.g., where ports 1 and 2 are in fluid communication; ports 3 and 4 are in fluid communication; and ports 5 and 6 are in fluid communication). Once in the loop 124, the sample can then be prepared for analysis by an analytical device (e.g., ICPMS) following introduction to the analytical device via the nebulizer 116 and the torch 118. In implementations, the second sample introduction system 114 is a prepFAST autodilution system from Elemental Scientific in Omaha, Nebr. to prepare the sample for analysis by the analytical device (e.g., via inline autodilution of the sample and standards).

Figure 1C:
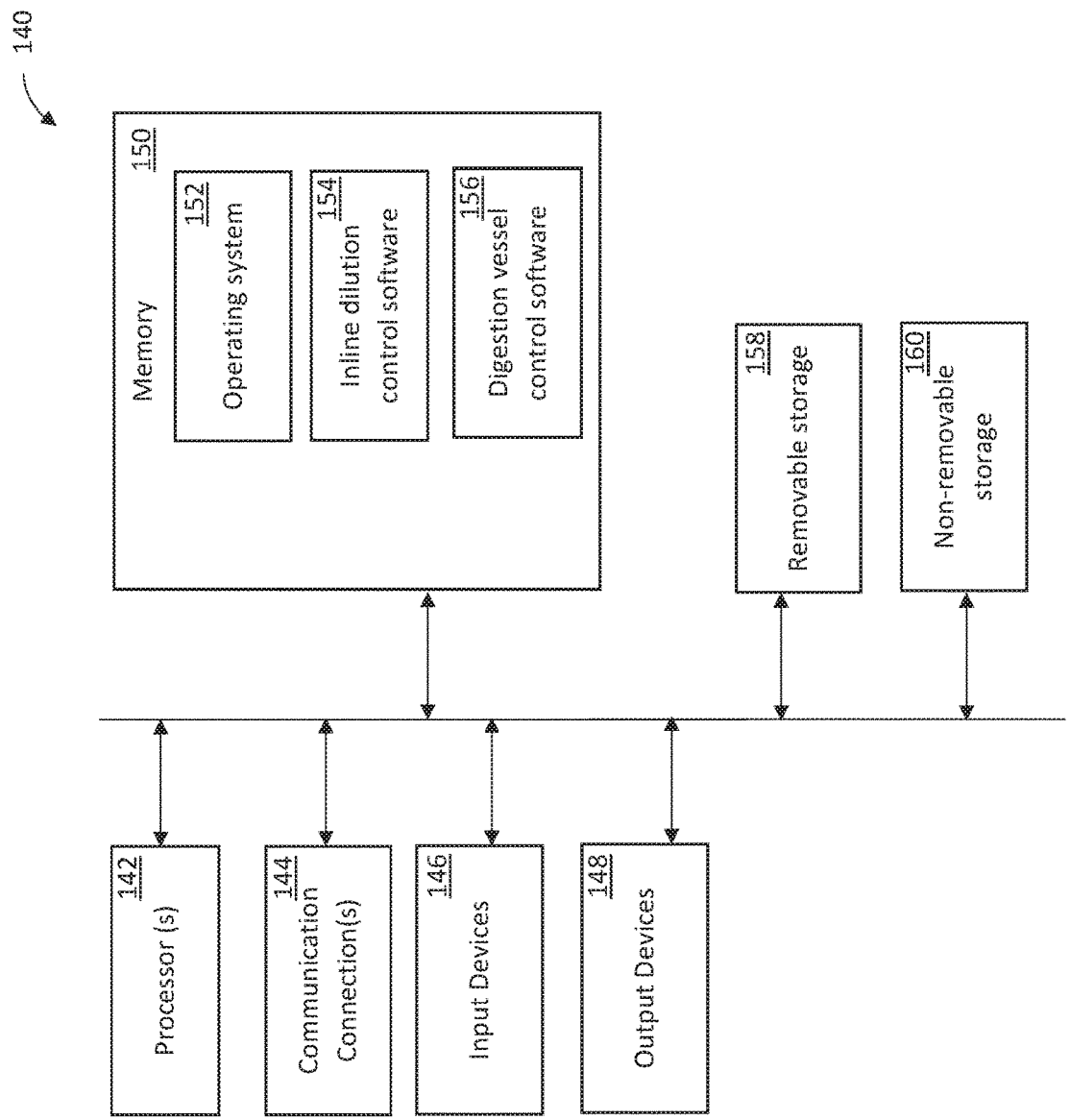
FIG. 1C illustrates an example computer device 140 configured for providing systems and methods for automatic sampling, digestion, and joining a plurality of sample introduction systems of a sample and for transport and preparation of the digested sample for analysis in accordance with certain embodiments of the disclosure.

Referring now to FIG. 1A and FIG. 1C, the system 100 can automatically manage sampling of fluids within the system 100, digest samples through operation of the digestion system 104 and components operably coupled thereto (e.g., filter system 108, connector valve 110, cutoff valve 120, first pump system 106, second pump system 130, etc.), facilitate joining of a plurality of samples from sample introduction systems (such as, from sample introduction system 122 and second sample introduction system 114) and facilitate manipulating samples for analysis by an analysis device (e.g., through inline dilution of samples, standards, and the like, to operate with known dilution factors, automatically create standard calibration curves, and the like).

For example, the system 100 can include a computing device or controller 140 including a processor 142 and a memory 150, as illustrated in FIG. 1C. The processor 142 provides processing functionality for the computing device 140 and may include any number of processors, micro-controllers, or other processing systems, and resident or external memory for storing data and other information accessed or generated by the computing device. The processor may execute one or more software programs that implement the techniques described herein. The processor is not limited by the materials from which it is formed, or the processing mechanisms employed therein and, as such, may be implemented via semiconductor(s) and/or transistors (e.g., electronic integrated circuits (ICs)), and so forth.

The memory 150 is an example of device-readable storage media that provides storage functionality to store various data associated with the operation of the computing device, such as the software program and code segments mentioned above, or other data to instruct the processor and other elements of the computing device to perform the techniques described herein. Although a single memory is mentioned above, a wide variety of types and combinations of memory may be employed. The memory 150 may be integral with the processor, stand-alone memory, or a combination of both. The memory may include, for example, removable and non-removable memory elements such as an operating system 152, RAM, ROM, Flash (e.g., SD Card, mini-SD card, micro-SD Card), magnetic, optical, USB memory devices, and so forth. In embodiments of the computing device, the memory 150 may include removable ICC (Integrated Circuit Card) memory such as provided by SIM (Subscriber Identity Module) cards, USIM (Universal Subscriber Identity Module) cards, UICC (Universal Integrated Circuit Cards), and so on. FIG. 1C shows removable storage 158 and non-removable storage 160 as separate from the memory 150. In other embodiments, removable storage 158 and non-removable storage 160 may also be included within the memory 150.

The computing device 140 may include a display to display information to a user of the computing device. In embodiments, the display may comprise a CRT (Cathode Ray Tube) display, an LED (Light Emitting Diode) display, an OLED (Organic LED) display, an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display may be backlit via a backlight such that it may be viewed in the dark or other low-light environments.

The display may be provided with a touch screen to receive input (e.g., data, commands, etc.) from a user. For example, a user may operate the computing device by touching the touch screen and/or by performing gestures on the touch screen. In some embodiments, the touch screen may be a capacitive touch screen, a resistive touch screen, an infrared touch screen, combinations thereof, and the like. The computing device may further include one or more input/output (I/O) devices 146 and 148 (e.g., a keypad, buttons, a wireless input device, a thumbwheel input device, a trackstick input device, and so on). The I/O devices may include one or more audio I/O devices, such as a microphone, speakers, and so on.

The computing device may also include one or more communication connections 144 representative of communication functionality to permit computing device to send/receive data between different devices (e.g., components/ peripherals) and/or over one or more networks. The communication connections 144 may be representative of a variety of communication components and functionality including, but not necessarily limited to: a browser; a transmitter and/or receiver; data ports; software interfaces and drivers; networking interfaces; data processing components; and so forth.

The one or more networks are representative of a variety of different communication pathways and network connections which may be employed, individually or in combinations, to communicate among the components of the automatic sampling and digestion environment. Thus, the one or more networks may be representative of communication pathways achieved using a single network or multiple networks. Further, the one or more networks are representative of a variety of different types of networks and connections that are contemplated including, but not necessarily limited to: the Internet; an intranet; a Personal Area Network (PAN); a Local Area Network (LAN) (e.g., Ethernet); a Wide Area Network (WAN); a satellite network; a cellular network; a mobile data network; wired and/or wireless connections; and so forth.

Examples of wireless networks include but are not necessarily limited to: networks configured for communications according to: one or more standard of the Institute of Electrical and Electronics Engineers (IEEE), such as 802.11 or 802.16 (Wi-Max) standards; Wi-Fi standards promulgated by the Wi-Fi Alliance; Bluetooth standards promulgated by the Bluetooth Special Interest Group; and so on. Wired communications are also contemplated such as through Universal Serial Bus (USB), Ethernet, serial connections, and so forth.

The computing device 140 may include a user interface (not shown), which is storable in memory and executable by the processor. The user interface is representative of functionality to control the display of information and data to the user of the computing device via the display. In some implementations, the display may not be integrated into the computing device 140 and may instead be connected externally using universal serial bus (USB), Ethernet, serial connections, and so forth. The user interface may provide functionality to allow the user to interact with one or more applications of the computing device by providing inputs (e.g., sample identities, desired dilution factors, desired digestion fluids, standard solution types, etc.) via the touch screen and/or the I/O devices. For example, the user interface may cause an application programming interface (API) to be generated to expose functionality to an inline dilution control software 154 program, a digestion vessel control software 156 program, or other software program to configure the application for display by the display or in combination with another display. In embodiments, the API may further expose functionality to configure an inline dilution control software program to allow the user to interact with an application by providing inputs via the touch screen and/or the I/O devices to provide desired dilution factors for analysis.

The inline dilution control software 154 program, the digestion vessel control software 156 program, or other programs may comprise software, which are storable in memory and executable by the processor, to perform a specific operation or group of operations to furnish functionality to the inline dilution system or the digestion vessel. The inline dilution control software program provides functionality to control the dilution of, for example, an internal standard and/or the samples from the sample input 102, the secondary sample source 112, or combinations thereof. For example, the inline dilution control software 154 program, the digestion vessel control software 156 program, or other program may control amounts of carrier, diluent, acid, deionized water, standard, or other fluid that are supplied by pumps of the system 100 (e.g., syringe pumps of the first pump system 106, the second pump system 130, etc.).

Generally, any of the functions described herein can be implemented using software, firmware, hardware (e.g., fixed logic circuitry), manual processing, or a combination of these implementations. The terms "computing device" as used herein generally represent software, firmware, hardware, or a combination thereof. The communication between components in the system 100, for example, can be wired, wireless, or some combination thereof. In the case of a software implementation, for instance, software may represent executable instructions that perform specified tasks when executed on a processor, such as the processor described herein. The program code can be stored in one or more device-readable storage media, an example of which is the memory associated with the computing device.

Example Processes

The following discussion describes procedures that may be implemented in the apparatus for automatic sampling and digestion of a sample. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 3A:
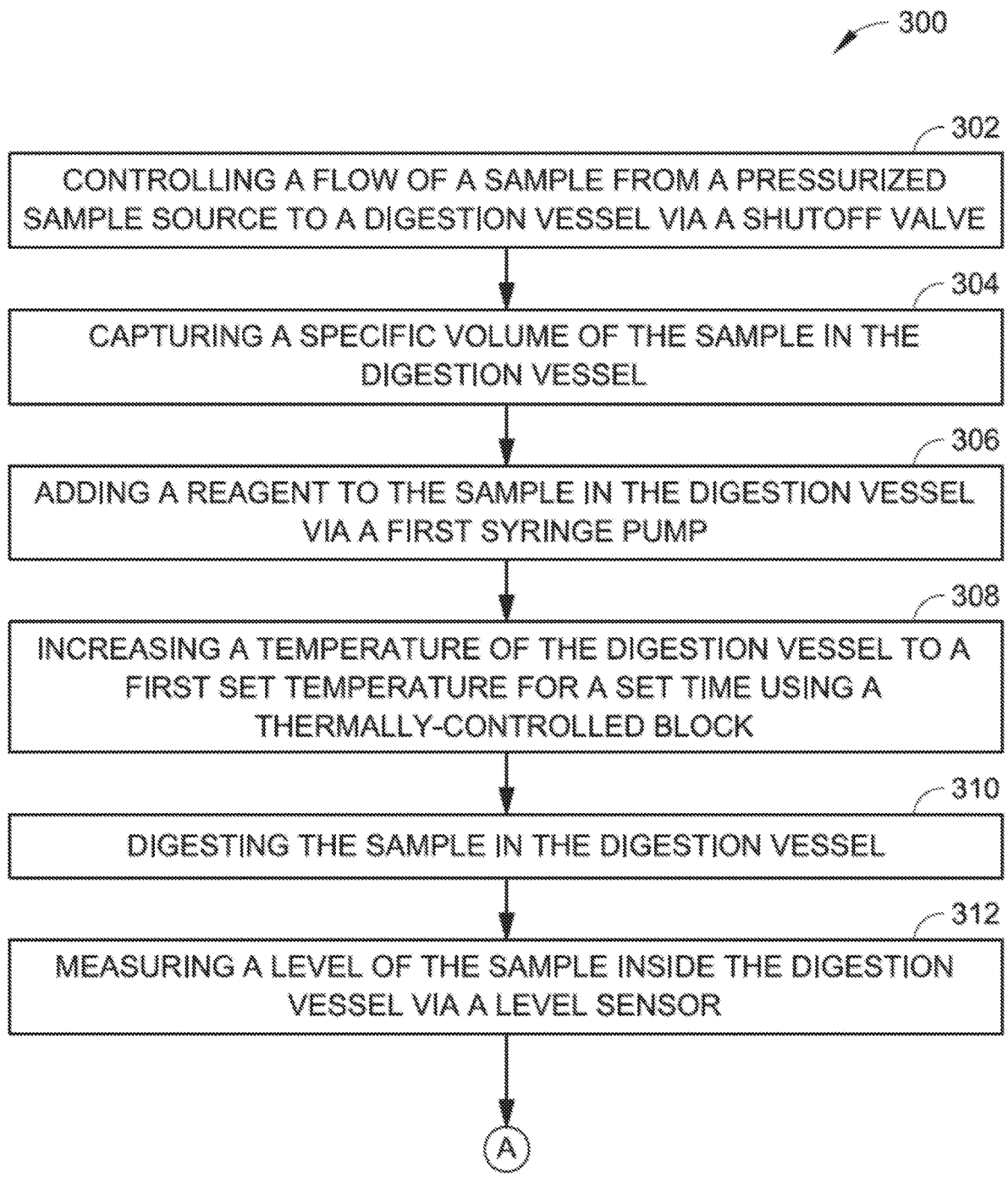
FIG. 3A is a flow diagram illustrating an example process for a system for automatic sampling and digestion of a sample for analysis, such as the system illustrated in FIGS. 1A, 1B, and 2, in accordance with example implementations of the present disclosure.
Figure 3B:
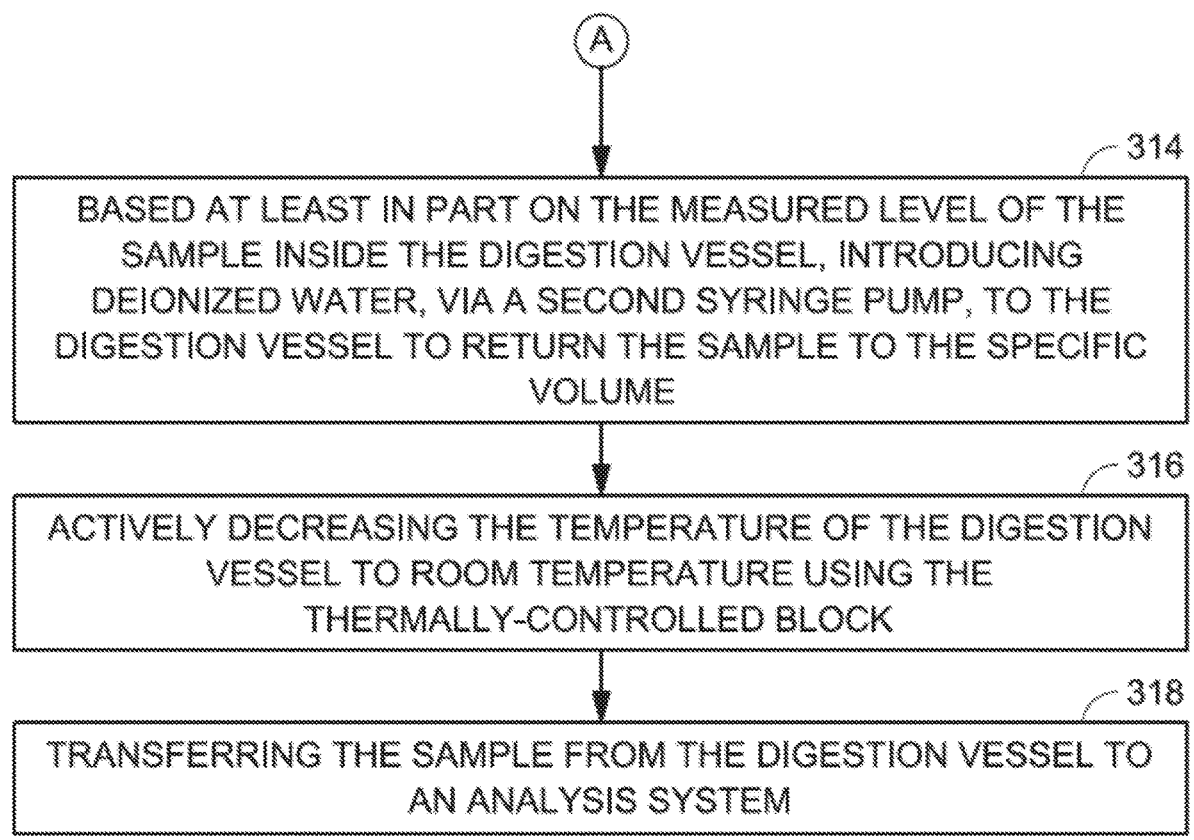
FIG. 3B is a flow diagram illustrating an example process for a system for automatic sampling and digestion of a sample for analysis, such as the system illustrated in FIGS. 1A, 1B, and 2, in accordance with example implementations of the present disclosure.

FIGS. 3A and 3B illustrate a method 300 for automatic sampling and digestion of a sample, such as the system 100 described above. The method 300 can include: controlling a flow of a sample from a pressurized sample source to a digestion vessel via a shutoff valve (block 302); capturing a specific volume of the sample in the digestion vessel (block 304); adding a reagent to the sample in the digestion vessel via a first syringe pump (block 306); increasing a temperature of the digestion vessel to a first set temperature for a set time using a thermally-controlled block (block 308); digesting the sample in the digestion vessel (block 310); measuring a level of the sample inside the digestion vessel via a level sensor (block 312); based at least in part on the measured level of the sample inside the digestion vessel, introducing deionized water, via a second syringe pump, to the digestion vessel to return the sample to the specific volume (block 314); actively decreasing the temperature of the digestion vessel to room temperature using the thermally-controlled block (block 316); and transferring the sample from the digestion vessel to an analysis system (block 318).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A system, comprising:
 a digestion vessel configured to receive a sample from a pressurized sample source;

a shutoff valve configured to control a flow of the sample to the digestion vessel;
a first pump configured to introduce a reagent to the sample in the digestion vessel;
a thermally-controlled block surrounding the digestion vessel and configured to control the temperature of the digestion vessel, wherein the thermally-controlled block increases the temperature of the digestion vessel to a first set temperature for a duration of time to permit digestion of at least a portion of the sample within the digestion vessel and wherein the thermally-controlled block decreases the temperature of the digestion vessel to a second set temperature after the duration of time;
a level sensor configured to measure a level of the sample inside the digestion vessel at least after the duration of time;
a second pump configured to introduce deionized water to the digestion vessel, based at least in part on the level measured by the level sensor; and
a connector valve configured to receive digested sample from the digestion vessel and transfer the digested sample to an analysis system.

2. The system of claim 1, further comprising:
a filtration system configured to filter the digestion sample prior to transfer to the analysis system.

3. The system of claim 1, further comprising:
a controller coupled to the digestion vessel, the shutoff valve, the first pump, the thermally-controlled block, the level sensor, the second pump, and the connector valve, the controller configured to control at least one of: sampling of fluids, operation of the digestion vessel, or manipulating samples for analysis by the analysis system.

4. The system of claim 1, wherein the digestion vessel further comprises:
a secondary overflow outlet comprising a leak sensor to monitor flow of fluid through the secondary overflow outlet.

5. The system of claim 1, further comprising:
an agitation system for managing agitation of the digestion vessel, comprising:
a magnetic stir bar; and
a magnetic stir plate to control rotation of the magnetic stir bar within the digestion vessel.

6. The system of claim 1, wherein the thermally-controlled block further comprises: a peltier device.

7. The system of claim 1, further comprising: a sample loop in fluid communication with the connector valve, the sample loop configured to receive at least one of:
the sample pushed by a first pump or a second sample pulled by a second pump.

8. A method, comprising:
controlling a flow of a sample from a pressurized sample source to a digestion vessel via a shutoff valve;
capturing a specific volume of the sample in the digestion vessel;
adding a reagent to the sample in the digestion vessel via a first pump;
increasing a temperature of the digestion vessel to a first set temperature for a set time using a thermally-controlled block to permit digestion of at least a portion of the sample within the digestion vessel;
measuring a level of the sample inside the digestion vessel via a level sensor;
based at least in part on the measured level of the sample inside the digestion vessel, introducing deionized water, via a second pump, to the digestion vessel to return the sample to the specific volume;
actively decreasing the temperature of the digestion vessel to a second set temperature that is less than the first set temperature using the thermally-controlled block; and
transferring the sample from the digestion vessel to an analysis system.

9. The method of claim 8, further comprising:
filtering the digested sample from the digestion vessel via a filtration system.

10. The method of claim 8, further comprising:
monitoring a flow of fluid through a secondary outlet port of the digestion vessel via a leak sensor.

11. The method of claim 8, wherein digesting the sample in the digestion vessel further comprises:
agitating the sample using an agitation system, the agitation system comprising:
a magnetic stir bar; and
a magnetic stir plate to control rotation of the magnetic stir bar within the digestion vessel.

12. The method of claim 8, wherein the thermally-controller block further comprises a peltier device.

13. The method of claim 8, further comprising:
receiving, via a sample loop, at least one of: the sample pushed by a first pump or a second sample pulled by a second pump;
wherein the sample loop is in fluid communication with the connector valve.

14. The method of claim 8, wherein transferring the sample from the digestion vessel to an analysis system further comprises:
drawing, via a third pump, the sample from the digestion system into a sample loop;
pushing, via the third pump, the sample from the sample loop into the filtration system; and
introducing the sample from the filtration system to the connector valve.

15. A system comprising:
a connector valve coupled between at least two sample introduction systems, the connector valve configured to receive a first sample from a first sample introduction system and a second sample from a second sample introduction system, wherein the first sample introduction system comprises:
a digestion vessel configured to receive the first sample from a pressurized sample source;
a shutoff valve configured to control a flow of the first sample to the digestion vessel;
a first pump configured to introduce a reagent to the first sample in the digestion vessel;
a thermally-controlled block surrounding the digestion vessel and configured to control the temperature of the digestion vessel, wherein the thermally-controlled block increases the temperature of the digestion vessel to a first set temperature for a duration of time to permit digestion of at least a portion of the sample within the digestion vessel and wherein the thermally-controlled block decreases the temperature of the digestion vessel to a second set temperature after the duration of time;
a level sensor configured to measure a level of the first sample inside the digestion vessel at least after the duration of time; and
a second pump configured to introduce deionized water to the digestion vessel, based at least in part on the level of the first sample measured by the level sensor;

a sample loop in fluid communication with the connector valve, the sample loop configured to receive the first sample pushed by the first pump and configured to receive the second sample pulled by the second pump; and an analysis system configured to analyze at least one of: the first sample or the second sample.

16. The analysis system of claim 15, further comprising an Inductively Coupled Plasma (ICP) Spectrometer, an Inductively Coupled Plasma Atomic Emission Spectrometer (ICP-AES) or an Inductively Coupled Plasma Mass Spectrometer (ICP-MS).

17. The system of claim 15, further comprising: an agitation system for managing agitation of the digestion vessel, comprising:

a magnetic stir bar; and a magnetic stir plate to control rotation of the magnetic stir bar within the digestion vessel.

18. The system of claim 15, wherein the thermally-controlled block comprises: a peltier device.

19. The system of claim 15, further comprising: a sample loop in fluid communication with the connector valve, the sample loop configured to receive at least one of:

the sample pushed by the first pump or the second sample pulled by the second pump.

20. The system of claim 15, further comprising:

a controller coupled to the digestion vessel, the shutoff valve, the first pump, the thermally-controlled block, the level sensor, the second pump, and the connector valve, the controller configured to control at least one of: sampling of fluids, operation of the digestion vessel, or manipulating samples for analysis by the analysis system.

* * * * *